United States Patent Office 3,291,576
Patented Dec. 13, 1966

3,291,576
PRODUCTION OF HYDRATED SODIUM HYDROXIDE
Joseph V. Otrhalek, Dearborn, Mich., assignor to Wyandotte Chemicals Corporation, Wyandotte, Mich., a corporation of Michigan
No Drawing. Filed Dec. 24, 1963, Ser. No. 333,199
1 Claim. (Cl. 23—302)

This invention relates to the production of solid caustic soda. More particularly, the invention provides a method whereby solid caustic soda may be processed without the absorption of moisture from the atmosphere.

The preparation and marketing of caustic soda in powdered, flaked or granular form is well known. However, there are certain well recognized disadvantages in manufacturing and handling the material in the aforementioned forms. It is well known that caustic soda has a great affinity for and absorbs moisture from the atmosphere. In describing the hygroscopic nature of caustic soda, the Fourth Edition of Thorpe's Dictionary of Applied Chemistry, Longmans, Green and Company, New York, vol. 10, page 855, states:

"It [sodium hydroxide] is very hygroscopic and rapidly absorbs water and carbon dioxide from the atmosphere becoming wet and slimy in the process. The hydroxide is therefore used as a drying agent in both the laboratory and in industry."

The efficiency of sodium hydroxide as an industrial drying agent is reported in the Journal of Research of the National Bureau of Standards, 1934, vol. 12, page 241, and by Baxter and Starkweather in the Jour. of the Am. Chem. Soc., 1916, vol. 38, page 2038.

Another disadvantage in utilizing granular or flake caustic soda is that if such a material is allowed to absorb moisture and then dried, it assumes the form of a caked, lumpy mass and must be reprocessed to restore it to its original condition. Such an expedient, of course, is uneconomical.

In many applications, it is desirable to utilize caustic soda in a form consisting of discrete, dry particles. Heretofore, various agents have been suggested as coating materials as a solution of the well-recognized problems due to the hygroscopic nature of solid caustic soda. Thus, the use of coating agents such as phthalic anhydride, sodium carbonate and silica has been suggested to prevent moisture absorption by caustic soda and to retain the particles in the intended form. See U.S. Patents 2,639,221 and 3,007,877. However, such expedients have not been totally effective for the coating agents may not be compatible with the final formulation or an inordinately large amount of the coating material is required to accomplish any degree of improvement. In any event, the use of such materials represents an added processing expense and, therefore, is not totally acceptable.

It is an object of this invention to provide a method of preparing and processing solid caustic soda to avoid the aforementioned deficiencies of the prior art. Another object is to prepare and process non-caking and non-sticking caustic soda without the necessity of using drying agents.

The present invention is predicated on the discovery that contrary to prior art beliefs, a particular hydrate of caustic soda has a critical humidity and, thus, can be processed in the proper environment without absorption of moisture. It has now been discovered that solid sodium hydroxide prepared from an approximate 69% caustic liquor solution has a critical humidity between 10 and 15% and, therefore, can be processed in a moisture-containing atmosphere maintained below the critical humidity level without absorbing moisture. By "critical humidity" is meant that humidity above which a material will absorb moisture and become damp and below which no moisture is absorbed and the material remains dry. Thus, a particular caustic soda may be prepared in the desired particulate form, i.e. flake, granular or powder, and processed without incurring the problems associated with hygroscopic caustic soda.

The caustic soda compositions utilized in the present invention correspond to sodium hydroxide monohydrate, i.e. are composed of approximately 69% sodium hydroxide and 31% water. While any deviation from this composition represents undesired impurities in the product, small deviations corresponding to, say, plus or minus 1% sodium hydroxide may be tolerated while still obtaining the benefits of the present invention. However, for sodium hydroxide concentrations much greater than 69%, the material no longer retains its critical humidity and at lower concentrations of sodium hydroxide the product, under ambient conditions, does not solidify but remains in the form of a slush or slurry. It is very surprising that this particular hydrate of sodium hydroxide should possess a critical humidity for, as far as we are aware, it has always been assumed that any solid caustic soda is hygroscopic and absorbs water from a moisture-containing atmosphere.

Broadly, this invention contemplates the preparation, handling, storage and processing of sodium hydroxide monohydrate in an atmosphere where the relative humidity has been adjusted to a value below about 15%. The processing may be conducted at any humidity below the critical value. However, there is no particular advantage in using humidities much below the critical value and, of course, such an expedient imposes an economic disadvantage. Thus, the process may be carried out at levels just below the critical relative humidity, i.e. at about 10%. The critical relative humidity over the practical operating temperature range of about 40–120° F. is subject only to minor variations and, for practical purposes, may be considered to be essentially constant.

Various applications and modifications of the principles of this invention are contemplated. To prevent excessive moisture pickup during manufacturing, a hot 69% caustic liquor solution may be cooled and solidified and further processed in an atmosphere having a relative humidity below about 15%. This expedient is particularly useful in those operations wherein the caustic is frozen into a sheet and further processed by chopping, grinding, etc., to obtain the desired particle form. The solid caustic soda in its desired form may then be conveyed for further processing and/or packaging in an atmosphere below 15% relative humidity without the absorption of moisture. Similarly, such particles of caustic soda may be packaged in air-tight containers in which any air has a relative humidity below the critical value.

The user or formulator may utilize a similar procedure in the further processing of the caustic material. Thus, in compounding the granular caustic soda with "detergent builders" to formulate a finished detergent, the mixing procedure may be carried out in an atmosphere having the required relative humidity.

Another application of the principles of this invention is in shipping solid caustic soda in a particulate form. For both intra- and interplant shipping of bulk chemicals, a pneumatic conveying system is often utilized to great advantage. Thus, when shipping powder, pellets or granules, the material may be conveyed from the manufacturing plant to a railroad car or other transportation means by a closed pneumatic line. The recipient of the bulk chemical may unload the railroad car by similarly utilizing a pneumatic conveying system. In this manner, large economic savings are often effected. Such a system has heretofore not been usable to transport hygroscopic solid caustic soda. Due to moisture pickup, the caustic assumes a wet and sticky texture and adheres to the conveying system. Moreover, due to the large increase in density of the caustic particles, such a transportation system is not feasible. The use of an inert conveying gas such as nitrogen, while technically feasible, would be economically prohibitive.

Utilizing the method of this invention, solid sodium hydroxide monohydrate may be pneumatically conveyed by the use of air having a relative humidity of less than about 15% as the conveying medium. A continuous supply of air having the proper humidity may be used as the carrying medium or, more preferably, the air may be continually recirculated into the conveying system. This method of transporting sodium hydroxide monohydrate is applicable to movement of sodium hydroxide monohydrate within the plant and also from manufacturer to user. In the latter case, the subdivided caustic soda may be transported interplant by an enclosed railroad car or other enclosed transporting means wherein the atmosphere is maintained at below 15% relative humidity. Other modifications of this invention will be apparent to those skilled in the art.

The non-hygroscopic nature of sodium hydroxide monohydrate in the proper environment is illustrated by the data of the following example.

*Example I*

Experiments were carried out to compare the hygroscopic nature of caustic soda prepared from 69% and 74% caustic liquor solutions, respectively. Such solutions were chilled to their freezing point of about 144° F. to obtain a solid caustic product. The tests consisted of filling 80 ml. weighing bottles having a diameter of 70 mm. to a depth of ⅛″ with caustic. The weighing bottles were exposed in desiccators at controlled humidity over sulfuric acid at 75° F. The exposed surface of the weighing bottles was approximately 5.69 square inches. The amount of absorbed moisture was determined periodically by weighing the bottles. The results are shown in Table 1.

TABLE 1.—MOISTURE ABSORPTION OF 69% AND 74% SOLID CAUSTIC SODA PRODUCTS

| Ageing at 75° F. | Weight Gain, mg. | |
| --- | --- | --- |
| | 74% Caustic | 69% Caustic |
| 10% relative humidity: | | |
| 1 day | 15 | −1 |
| 3 days | 23 | −2 |
| 6 days | 28 | −6 |
| 15% relative humidity: | | |
| 1 day | 22 | 20 |
| 3 days | 56 | 55 |
| 6 days | 103 | 112 |

The above data show that for a 74% caustic product, moisture is absorbed at 10% and 15% relative humidity. With the product obtained from the 69% caustic liquor, about the same degree of moisture is absorbed at 15% relative humidity. However, in an atmosphere kept at 10% relative humidity, the 69% caustic material does not absorb moisture but, in fact, some moisture is lost to the atmosphere as indicated by the loss in product weight. Thus, at a point within the range of 10 to 15% relative humidity, sodium hydroxide monohydrate has a critical humidity. This property is not possessed by products derived from 74% caustic liquor solutions, which is the usual product of commerce.

The sodium hydroxide monohydrate of this invention may be crystallized from the caustic liquor in a relatively pure form, or certain other ingredients may be included in the melt prior to freezing. Such an expedient is especially attractive in the detergent art wherein caustic soda is usually mixed with other "detergent builders" to formulate a final detergent product. Thus, to the molten sodium hydroxide monohydrate may be added other detergent constituents such as sodium chloride, sodium sulfate, sodium carbonate, the various sodium phosphates including trisodium phosphate and tetrasodium pyrophosphate, surface active agents such as the sodium salts of fatty acids, of rosin acids and of alkaryl sulfonates. These latter materials may also be added as the free acids which then react with caustic to form the desired salt. Other agents that may be included in the melt include nonionic surface active agents such as alkyl phenol polyglycol ethers, fatty acid polyglycol esters and other agents such as dyes, perfumes and various fillers, sodium carboxymethyl-cellulose, clays, etc.

I claim:

In the transporting of solid sodium hydroxide monohydrate, the improvement which comprises transporting said sodium hydroxide monohydrate in a moisture-containing atmosphere maintained at a relative humidity of less than 15%.

References Cited by the Examiner

UNITED STATES PATENTS

| | | | |
| --- | --- | --- | --- |
| 1,863,791 | 6/1932 | Heise | 23—184 |
| 2,112,813 | 3/1938 | Lopez | 23—302 |
| 2,178,694 | 11/1939 | Muskat | 23—302 |
| 2,196,595 | 4/1940 | Muskat | 23—302 |
| 2,285,300 | 6/1942 | Muskat | 23—184 |
| 2,373,257 | 4/1945 | Muskat | 23—184 |

NORMAN YUDKOFF, *Primary Examiner.*

G. P. HINES, *Assistant Examiner.*

UNITED STATES PATENT OFFICE
CERTIFICATE OF CORRECTION

Patent No. 3,291,576                                December 13, 1966

Joseph V. Otrhalek

It is hereby certified that error appears in the above numbered patent requiring correction and that the said Letters Patent should read as corrected below.

Column 4, line 36, beginning with "In the" strike out all to and including "than 15%." in line 40, same column and insert instead -- The method which comprises precipitating solid sodium hydroxide monohydrate from a caustic soda liquor comprising about 69% sodium hydroxide and 31% water in a moisture-containing atmosphere maintained at a relative humidity of about 10% and further processing said sodium hydroxide monohydrate in an atmosphere maintained at less than about 10% relative humidity. --; column 3, line 15, for "monohydate" read -- monohydrate --.

Signed and sealed this 26th day of September 1967.

(SEAL)
Attest:

ERNEST W. SWIDER                              EDWARD J. BRENNER
Attesting Officer                          Commissioner of Patents